UNITED STATES PATENT OFFICE.

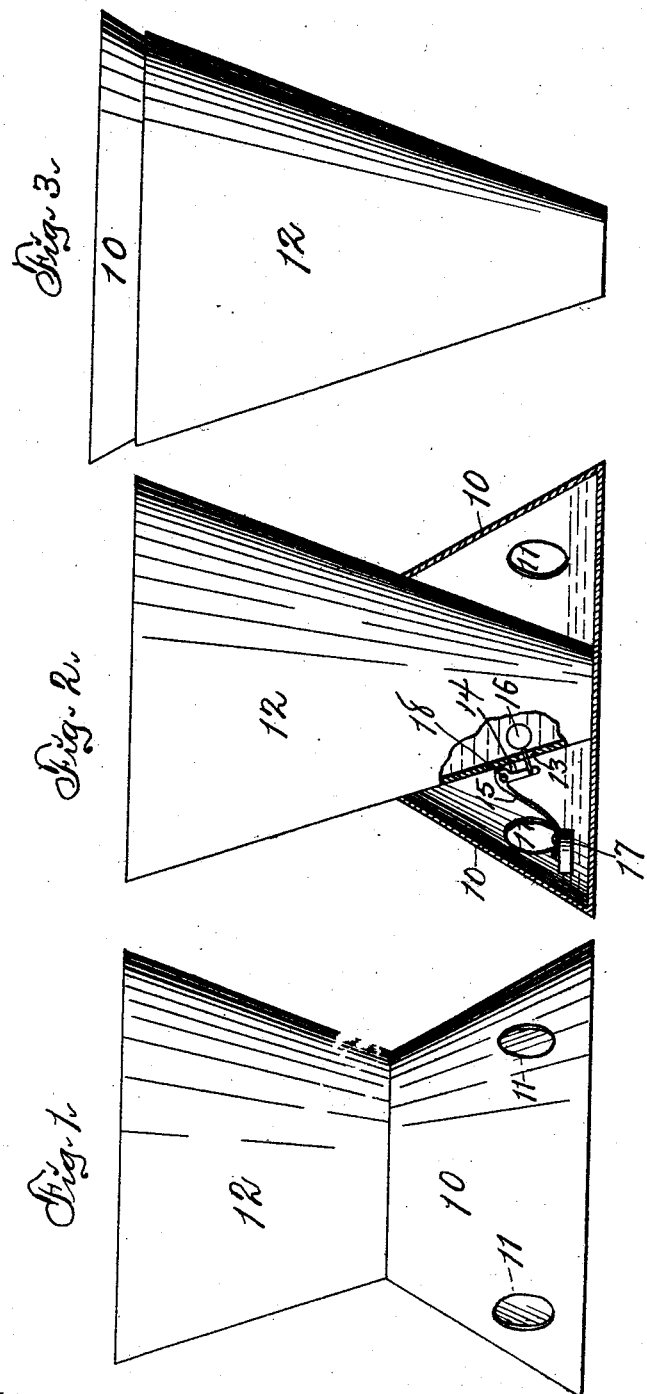

ANDREW A. KRAMER, OF KANSAS CITY, KANSAS.

STOCK AND POULTRY FOUNTAIN.

940,259.

Specification of Letters Patent.

Patented Nov. 16, 1909.

Application filed November 17, 1908. Serial No. 463,469.

*To all whom it may concern:*

Be it known that I, ANDREW A. KRAMER, a citizen of the United States of America, and resident of Kansas City, Wyandotte county, Kansas, have invented a new and useful Stock and Poultry Fountain, of which the following is a specification.

The object of this invention is to provide an improved construction for stock fountains or watering tanks.

A further object of this invention is to provide improved means for arranging a water tank for storage and shipment.

A further object of this invention is to provide an improved construction for a stock fountain whereby small animals and poultry can have access to the interior thereof and yet be restrained from entering the fountain wholly.

A further object of this invention is to provide a two-part separable fountain and tank.

My invention consists in the construction, arrangement and combination of elements hereinafter set forth, pointed out in my claims and illustrated by accompanying drawing, in which—

Figure 1 is a side elevation of the complete tank in position for practical use. Fig. 2 is a vertical section of the same. Fig. 3 is a side elevation of the tank nested for storage or shipment, the valve and float being removed.

In the construction of the device as shown the numeral 10 designates a frustum shaped pan preferably formed of sheet metal and open at its top. The pan 10 is provided with a plurality of circular drink openings 11 in its side and approximately midway between the top and bottom margins thereof. A frustum shaped tank 12 is provided and is of greater taper and greater depth than the pan 10. The tank 12 is mounted vertically in the pan 10, and the smaller end portion thereof extends through the open smaller end of the pan 10 and rests on the bottom thereof loosely. The smaller end portion of the tank 12 is closed and the other end portion thereof is directed upwardly and is open. A communicating port 13 is formed in the side of the tank 12 near its closed lower end and provides communication for water from the tank 12 to the pan 10. An ear 14 is fixed to the side of the tank 12 adjacent to the port 13, and a lever 15, of bell crank form, is fulcrumed on said ear and extends within the pan 10. The short arm of the lever 15 is connected to a valve 16 within the tank 12 and adapted to close the port 13. A float 17 is fixed to the extremity of the long arm of the lever 15 within the pan 10 and is adapted to be raised by water within said pan to oscillate said lever and cause the valve 16 to close the port 13. The fulcrum of the lever 15 on the ear 14 is a removable pin or bolt 18, by means of which the lever can be removed from the ear conveniently. The connection between the valve 16 and lever 15 also is detachable.

In practical use the parts are assembled as shown in Figs. 1 and 2 and water is supplied in any desired manner to the tank 12. In cold weather it is better to supply a considerable quantity of water in order to decrease the liability of freezing. Large animals such as cattle and horses can drink derectly from the tank 12. Water flows through the port 13 from the tank 12 and fills the pan 10 to such level as is permitted by the float 17, such level being below the openings 11. Small animals and poultry have access to drink from the pan 10 through the openings 11 and the desired level of water in said pan is maintained automatically by the valve 16, lever 15 and float 17. It will be observed that the frustum shape of the pan 10, and the shape of the openings 11, permits the introduction of the snout or head of any small animal, such as a short-nosed hog, conveniently through either of the drink openings 11, and that the opposite inclination of the frustum shaped tank 12 mounted within the pan 10, serves as a wall to deter small animals and poultry from entrance to the pan 10 wholly. The fountain can be easily cleaned of refuse or repaired by removing the tank 12 from the pan 10.

When not in use the pan 10 and tank 12 are nested as shown in Fig. 3 by removing the tank 12 from the pan 10 (having first removed the lever and valve from the tank 12 through one of the openings 11) and then inverting the pan 10 and depositing the same in the open upper end of the tank 12. The valve, lever and float may be disposed within either of the tanks for storage or shipment. When the tanks are nested as shown the bundle is closed at each end and intermediate thereof.

I claim as my invention—

1. A stock and poultry fountain, comprising a frustum shaped sheet metal pan open at its apex and provided with drink openings in its side, and a frustum shaped sheet metal tank loosely and removably mounted in inverted position within and wholly supported by the pan and open at its top, said tank formed with a valve controlled opening communicating with said pan.

2. A stock and poultry fountain, comprising a frustum shaped sheet metal pan open at its top and provided with drink openings in its side, and a frustum shaped sheet metal tank of greater altitude than the pan and mounted in an inverted position therein, the tank closed at its lower end and resting on the bottom of the pan and open at its upper end, the walls of said pan and tank inclining on different planes, said tank formed with a valve controlled opening within and communicating with said pan, the apex opening of the pan fitting and supporting the central portion of the tank.

3. A stock and poultry fountain, comprising a frustum shaped sheet metal pan open at its apex and formed with circular drink openings in its side, an inverted frustum shaped sheet metal tank mounted in the pan, closed at its bottom and open at its top and resting on the bottom of the pan, the inverted frustum shaped tank formed with a communicating port, a valve in said tank and adapted to close said port, a float lever located within the pan and fulcrumed on the tank and connected to said valve, and a float within said pan below the drink openings thereof and secured to said lever.

4. A stock and poultry fountain, comprising a pan formed of sheet metal and having a base and a frustum shaped wall secured to said base and open at its apex, said wall formed with circular openings near the base; a tank formed with a base and a flaring wall fixed to said base, said tank constructed of sheet metal and adapted to be mounted in and project outside of said pan, the base of the tank resting on the base of the pan and the wall of the pan embracing, fitting and supporting the central portion of the wall of the tank, the wall of the tank formed with a port near its base and communicating with the pan; a float lever within the pan fulcrumed to the wall of the tank; a stem pivoted to the float lever and extending through the port; a valve on said stem within the tank and adapted to close said port; and a float on said lever within the pan and below the drink openings thereof.

Signed by me at Des Moines, Iowa, this third day of November, 1908.

ANDREW A. KRAMER.

Witnesses:
W. W. FINK,
S. C. SWEET.